Patented Apr. 13, 1926.

1,580,392

UNITED STATES PATENT OFFICE.

ROY J. WENSLEY, OF EDGEWOOD PARK, PENNSYLVANIA, ASSIGNOR TO WESTINGHOUSE ELECTRIC & MANUFACTURING COMPANY, A CORPORATION OF PENNSYLVANIA.

AUTOMATIC STATION.

Application filed January 16, 1924. Serial No. 686,689.

To all whom it may concern:

Be it known that I, ROY J. WENSLEY, a citizen of the United States, and a resident of Edgewood Park, in the county of Allegheny and State of Pennsylvania, have invented a new and useful Improvement in Automatic Stations, of which the following is a specification.

My invention relates to automatic stations and particularly to excitation and controlling means for such stations One object of my invention is to provide an automatic station, in which the exciter generator shall furnish energy to the automatic controlling means of the station.

Another object of my invention is to provide a station, of the above-indicated character, in which a circuit interrupter for effecting connection between an electrical translating device and a circuit shall be actuated by energy taken directly from the exciter generator.

A further object of my invention is to provide an automatic station in which a storage battery for actuating certain of the automatic controlling means shall be maintained in an energy-storing condition by the exciter generator.

A still further object of my invention is to provide a system, of the above-indicated character, that shall be inexpensive to construct and simple and reliable in its operation.

In the preferred form, my invention comprises an electrical translating device, a prime mover for driving the translating device, a circuit for receiving energy from the translating device, means for effecting connection between the translating device and the circuit and a system of relays and circuit interrupters for controlling the operation of the station. A storage battery is provided for supplying energy to certain of the controlling means under predetermined conditions, and an exciter generator, for supplying energy to the field-magnet windings of the translating device, is so connected that it supplies energy to certain of the controlling means under other predetermined conditions. Under still other conditions, the exciter generator is adapted to furnish energy to the storage battery in order to maintain the battery in energy-storing condition.

Figure 1:
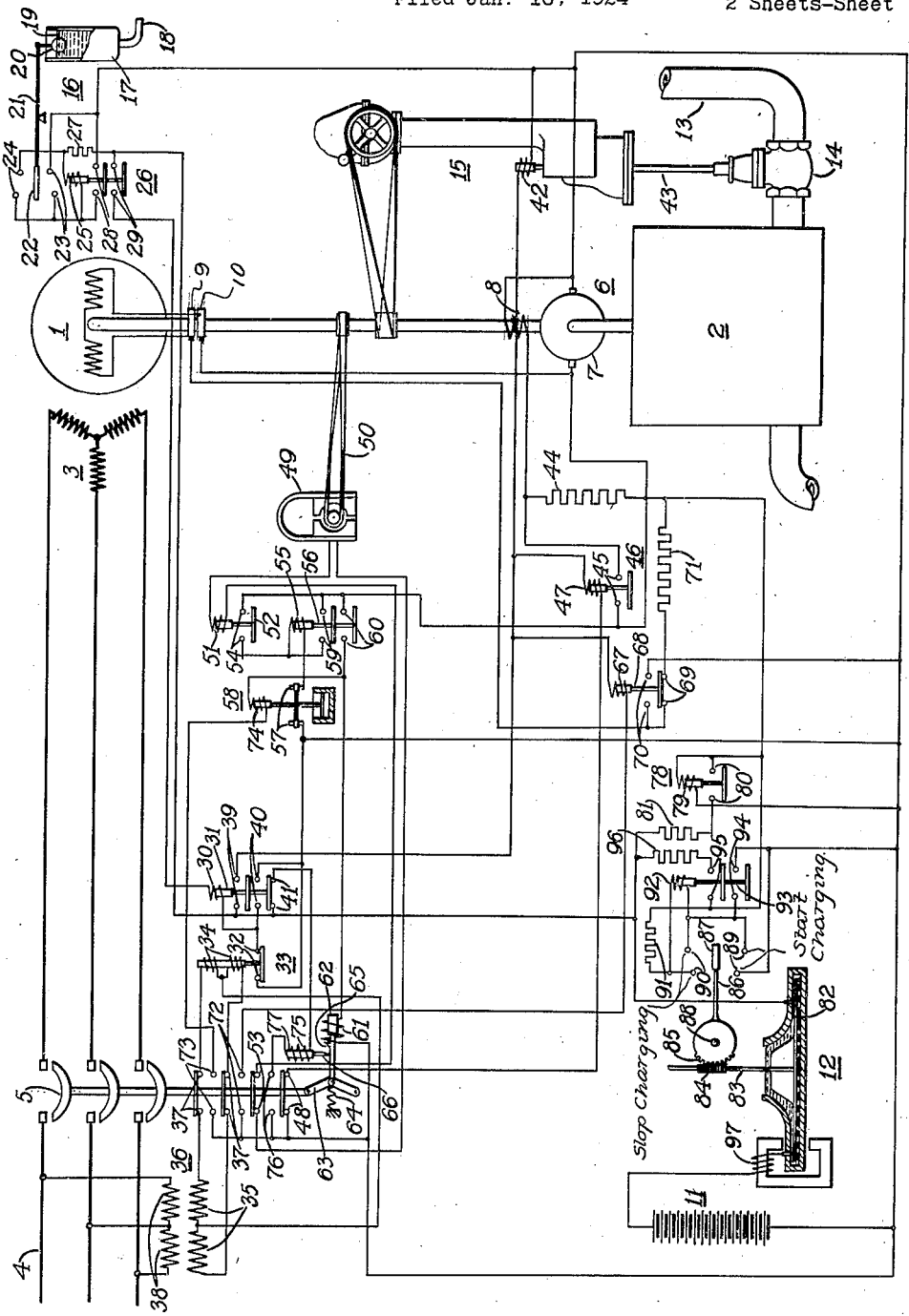
Figure 2:
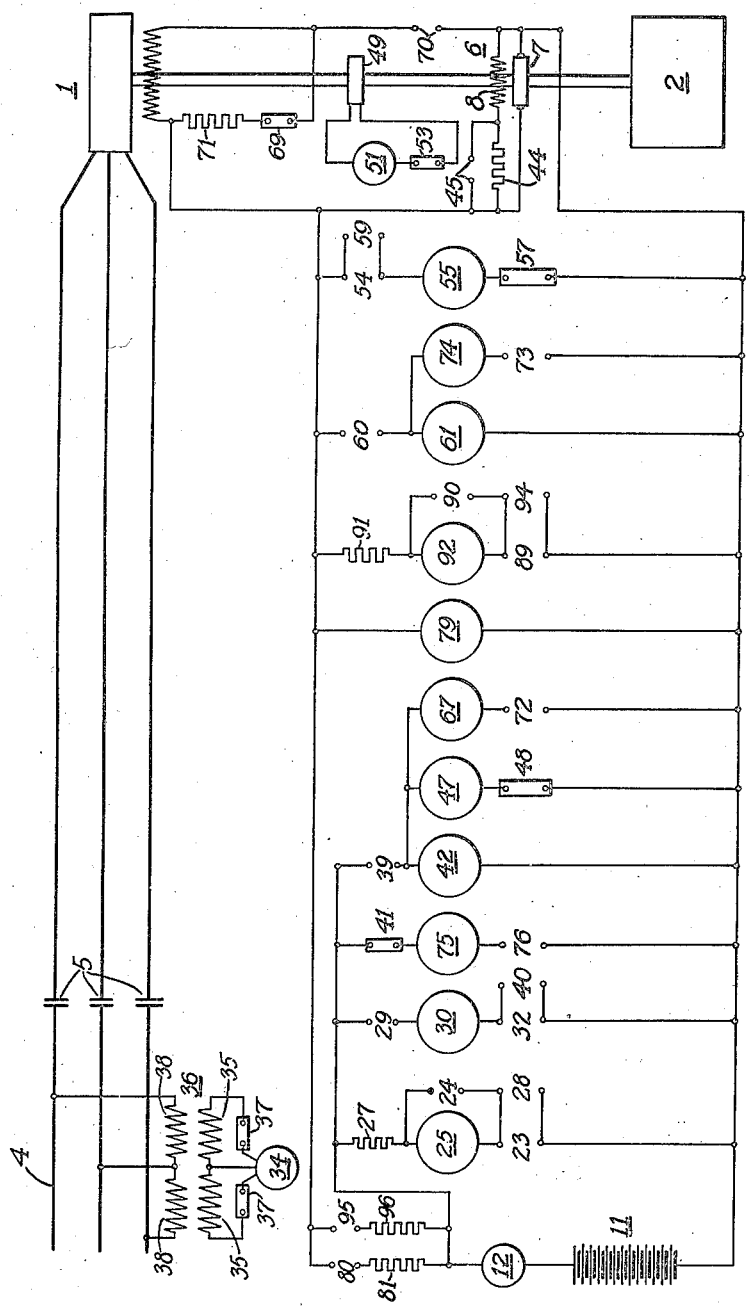

In the accompanying drawings,

Figure 1 is a diagrammatic representation of an electrical system in which my invention is embodied; and Fig. 2 is a schematic diagram of the same circuits.

Referring to Figure 1 of the drawings, a generator 1 that is driven by a prime mover 2 has a plurality of stator windings 3 that are adapted to be connected to a circuit 4 through a circuit interrupter 5. An exciter generator 6, comprising an armature member 7 and a field-magnet winding 8, is provided for the purpose of supplying energy to the field-magnet windings of the generator 1 through the slip rings 9 and 10. A storage battery 11 is connected through an ampere-hour meter 12 to the various circuits of the automatic means for controlling the operation of the station.

The prime mover 2 is operated by fluid energy supplied from a reservoir (not shown) through a pipe or conduit 13 and a gate valve 14, the degree of opening of which is controlled by a governor 15. In many hydroelectric generating stations, it is desired that the station shall operate in such manner as to maintain the level of water in the reservoir between predetermined limits. Thus, when the level of water in the reservoir rises to a predetermined value, it is desired to initiate the operation of the station and maintain the station in operation until the level falls to a predetermined value.

For the purpose of controlling the operation of the station in this manner, a float switch 16 is provided. A chamber 17 is connected through a pipe or conduit 18 to the reservoir in such manner that the level 19 of water in the chamber 17 is substantially the same as the level of water in the reservoir. Therefore, the position of a floating member 20 within the chamber 17 is controlled by the level of water in the reservoir. The floating member 20 is attached to one end of a lever arm 21, the other end of which supports a bridging member 22 that is adapted to engage contact members 23 and 24, respectively.

Let it now be assumed that the station is not operating and that the level of water in the reservoir is rising. When the level of water in the reservoir, and hence in the chamber 17, rises to a predetermined value, the floating member 20 actuates the bridging member 22 through the lever arm 21 in such manner as to effect engagement of the contact members 23. A circuit is thereby completed between the storage battery 11 and the operating coil 25 of a relay 26, through the ampere-hour meter 12, a resistor 27 and the contact members 23. The operating coil 25 of the relay 26 is thereby energized to cause the relay to effect engagement of contact members 28 and 29, respectively. The contact members 28 so shunt the contact members 23 as to maintain energization of the coil 25 after the contact members 23 have become disengaged.

Engagement of the contact members 29 completes a circuit between the storage battery 11 and the operating coil 30 of a relay 31 through the ampere-hour meter 12, the contact members 29 of the relay 26 and the contact members 32 of a relay 33. The relay 33 is provided with operating coils 34 that are connected to the secondary windings 35 of a potential transformer 36 through auxiliary contact members 37 of the circuit interrupter 5.

Primary windings 38 of the potential transformer 36 are connected directly to the circuit 4. Thus, when the various phases of the circuit 4 are of the proper potential, the transformer 36 will be sufficiently energized to maintain the relay 33 in its circuit-closing condition with respect to the contact members 32, provided that the circuit interrupter 5 is in its open position in which the contact members 37 are engaged.

Assuming these conditions to obtain, the operating coil 30 of the relay 31 will be energized from the storage battery 11 through the circuit described above, to thereby effect engagement of contact members 39 and 40, respectively, and disengagement of contact members 41. The contact members 40 so shunt the contact members 32 as to maintain energization of the coil 30 after the relay 33 has caused the contact members 32 to be disengaged. When the contact members 39 are engaged, a circuit is completed between the storage battery 11 and a solenoid coil 42 of the governor 15.

The governor 15 is of a well known type having a coil, such as 42, for so actuating a solenoid as to cause the governor to open the gate valve 14 by means of a connecting rod 43. When the gate valve 14 is open, water is permitted to flow from the reservoir through the prime mover 2 to thereby initiate the operation of the prime mover 2 and the generator 1. The exciter generator 6 that is directly connected to the shaft of the prime mover 2 is also started and as its speed increases, the voltage between its terminals starts to build up.

A resistor 44, that is normally connected in circuit between the armature member 7 and the field-magnet windings 8 of the exciter 6, is now short-circuited through contact members 45 of a relay 46. An operating coil 47 of the relay 46 is so energized from the storage battery 11 through the contact members 39 of the relay 31, and auxiliary contact members 48 of the circuit interrupter 5 as to maintain engagement of the contact members 45.

As the speed of the prime mover 2 and the generator 1 increases, the speed of an auxiliary generator 49, that is driven from the shaft of the prime mover 2 through a belt 50, increases proportionately. The generator 49 is of the magneto type which develops a voltage substantially in direct proportion to its speed. When the speed of the prime mover 2 and the generator 1 reaches a predetermined value, the voltage of the auxiliary generator 49 is sufficient to effect energization of the operating coil 51 of a relay 52 through the circuit extending through auxiliary contact members 53 of the circuit interrupter 5 that are engaged when the circuit interrupter 5 is in its open position. When the coil 51 is thus sufficiently energized, the relay 52 effects engagement of contact members 54.

When the contact members 54 are engaged, a circuit is completed from the terminals of the exciter generator 6 to the operating coil 55 of a relay 56 through the contact members 54 of the relay 52 and contact members 57 of a time-element relay 58 that are normally in engagement. Thus, if the voltage between the terminals of the exciter generator 6 is above a predetermined value, the coil 55 will be sufficiently energized to cause the relay 56 to effect engagement of contact members 59 and 60, respectively.

The contact members 59 so shunt the contact members 54 as to maintain energization of the coil 55 after the contact members 54 have become disengaged. Engagement of the contact members 60 completes a circuit extending from the exciter generator 6 to an operating coil 61 of the circuit interrupter 5. The coil 61 is thereby energized and cooperates with an armature member 62 and a toggle mechanism 63 to actuate the circuit interrupter 5 to its closed position against the force of a compression spring 64. When the operating mechanism of the circuit interrupter 5 is so actuated as to close the interrupter, a latch member 65 is engaged by a latch member 66 to hold the circuit interrupter in its closed position.

Up to the time when the circuit interrupter 5 is closed, the operating coil 67 of a relay 68 is de-energized to permit this relay to maintain engagement of contact members 69 and disengagement of contact members 70. When the contact members 69 are engaged, a circuit shunting the field-magnet windings of the generator 1 through the slip rings 9 and 10 and a resistor 71, is completed. Thus, until the circuit interrupter 5 is closed, the field-magnet windings of the generator 1 are close-circuited through the resistor 71.

When the circuit interrupter 5 is closed, however, auxiliary contact members 72 of this interrupter are engaged to effect energization of the operating coil 67 of the relay 68 from the storage battery 11 through the contact members 39 and 72, respectively. When the coil 67 is thus energized, the relay 68 effects disengagement of the contact members 69 and engagement of the contact members 70. Disengagement of the contact members 69 interrupts the circuit shunting the field-magnet windings of the generator through the resistor 71 and engagement of the contact members 70 connects the field-magnet windings of the generator 1 across the terminals of the exciter generator 6. The generator 1 is thus connected to the circuit 4, while its field-magnet windings are close-circuited through a resistor and when this close circuit is interrupted and the field-magnet windings are connected across the terminals of the exciter generator 6, the generator 1 is automatically brought into synchronism with the circuit 4.

Closing of the circuit interrupter 5 causes the auxiliary contact members 48 to be disengaged to interrupt the circuit extending through the operating coil 47 of the relay 46. The relay 46, being de-energized, causes the contact members 45 to be disengaged to reinsert the resistor 44 in circuit between the armature member 7 and the field-magnet windings 8 of the exciter generator 6. The exciter generator 6 then continues to operate under normal conditions with the resistor 44 in circuit with its field-magnet winding 8.

Auxiliary contact members 73 of the circuit interrupter 5 are also engaged when the circuit interrupter 5 is closed. Engagement of the contact members 73 completes a circuit extending from the terminals of the exciter generator 6 to the operating coil 74 of the time-element relay 58, through the contact members 60 and 73, respectively. Within a predetermined interval of time, after the energization of the coil 74, the relay 58 causes the contact members 57 to be disengaged to thereby interrupt the circuit extending through the operating coil 55 of the relay 56.

The relay 56 then causes the contact members 59 and 60, respectively, to be disengaged to interrupt the holding circuit of the relay 55, the circuit extending through the actuating coil 61 of the circuit interrupter 5, and the parallel circuit extending through the operating coil 74 of the time-element relay 58. The relay 58 thus returns to its de-energized condition and the energization of the actuating coil 61 of the circuit interrupter 5 is interrupted. The circuit interrupter 5, however, is held in its closed position by the latch members 65 and 66 until a tripping coil 75 is energized.

As long as the circuit interrupter 5 remains closed and the prime mover 2 continues to operate under control of the governor 15, the generator 1 continues to supply energy to the circuit 4. When the level of water in the reservoir and, therefore, in the chamber 17 falls below a predetermined value, however, it is no longer desirable that the station should continue to supply energy to the circuit 4. The contact members 24 of the float switch 16 are so disposed that, when the water level reaches this value, they are engaged by the bridging member 22, the position of which is controlled by the floating member 20 through the lever arm 21.

The contact members 24 so shunt the operating coil 25 of the relay 26 that, when they are engaged, the coil 25 is de-energized. The relay 26 then returns to its de-energized condition, disengaging contact members 28 and 29, respectively. Disengagement of the contact members 28 interrupts the holding circuit of the coil 25 and disengagement of the contact members 29 interrupts the circuit extending through the operating coil 30 of the relay 31. This relay is then de-energized to effect disengagement of the contact members 39 and 40 and engagement of the contact members 41.

When the contact members 41 are thus engaged, a circuit is completed from the storage battery 11 to the tripping coil 75 of the circuit interrupter 5, through the contact members 41 and auxiliary contact members 76 of the circuit interrupter 5 that are engaged when the interrupter is in its closed position. The magnetic flux set up within the coil 75 when it is so energized, acts upon an armature member 77 to cause this armature member to lift the latch member 66 out of engagement with the latch member 65. The compression spring 64 then acts upon the toggle mechanism 63 of the circuit interrupter 5 to open the interrupter and interrupt the supply of energy from the generator 1 to the circuit 4.

All of the relays and circuit interrupters of the controlling means of the station are now de-energized, including the solenoid coil 42 of the governor 15. When the coil 42 is de-energized, the governor 15 actuates the gate valve 14 to its closed position and operation of the prime mover 2 is stopped. With the prime mover 2 and the generator 1 in a non-operating condition and the controlling means of the station in a de-energized condition, all of the apparatus is in the same condition as before the station was started and is again ready to respond to the operation of the float switch 16 when the level of water in the reservoir rises to a predetermined value.

In order that as much of the energy as possible for actuating the controlling means of the station be supplied by the exciter generator 6 rather than by the storage battery 11, a relay 78 is provided. This relay has an operating coil 79 that is connected across the terminals of the exciter generator 6 in such manner that, when the voltage of the exciter generator rises to a predetermined value, the relay 78 causes its contact members 80 to be engaged. Engagement of the contact members 80 causes a resistor 81 to be connected in circuit between the storage battery 11 and the exciter generator 6.

The resistor 81 is of such value that subsequent to the making of this connection, energy for operating the controlling means of the station is taken from the exciter generator 6 rather than from the storage battery 11. Up until the time when the exciter generator 6 is in such an energy-delivering condition as to cause the contact members 80 to be engaged, it is necessary that the energy for operating the controlling means be supplied by the storage battery 11.

The ampere-hour meter 12, which is of a well known type, is so connected in circuit with the storage battery 11 that all the energy supplied by the storage battery to the controlling means traverses the meter. As current traverses the ampere-hour meter 12, a disc 82 is rotated in direct proportion to the number of ampere-hours traversing the meter. Attached to the disc 82 is a spindle 83 that supports a worm 84. The spindle 83 and the worm 84, therefore, rotate with the disc 82.

The worm 84 engages a worm wheel 85 that is provided with an extending member 86 supporting a bridging member 87 at the outer end thereof. As the worm 84 rotates, the worm wheel 85 is turned about its center 88 and causes the bridging member 87 to also turn about this center. The various parts of the ampere-hour meter are so disposed that, when energy is being taken from the storage battery 11, the bridging member 87 is actuated downwardly towards a pair of contact members 89 and when energy is being supplied to the battery, the bridging member is actuated upwardly towards a pair of contact members 90.

Let us now assume that energy is being taken from the storage battery 11 to actuate the various controlling means of the station. When a predetermined number of ampere-hours have traversed the ampere-hour meter 12, the bridging member 87 will have been actuated downwardly through a sufficient distance to engage the contact members 89. Engagement of the contact members 89 completes a circuit extending from the terminals of the exciter generator 6 to the operating coil 92 of a relay 93, through the contact members 89 and a resistor 91.

As soon after the contact members 89 are engaged, as the exciter generator 6 attains an energy-delivering condition, the operating coil 92 will be sufficiently energized to cause the relay 93 to effect engagement of its contact members 94 and 95, respectively. The contact members 94 so shunt the contact members 89 as to maintain energization of the coil 92 after the bridging member 87 has disengaged the contact members 89. When the contact members 95 are engaged, a resistor 96 is thereby connected in circuit in parallel relation with the resistor 81. The resultant value of resistance between the exciter generator 6 and the storage battery 11 is thereby decreased to such a degree as to cause the exciter generator 6 to supply energy to the storage battery 11 to return the battery to its proper energy-storing condition.

As energy is being delivered to the storage battery 11, the ampere-hour meter 12 is actuated in the reverse direction from that described above, and after it has been traversed by a predetermined number of ampere-hours, the bridging member 87 will have been actuated upwardly a sufficient distance to engage the contact members 90. The contact members 90 shunt the operating coil 92 of the relay 93 and when they are so engaged, by the bridging member 87, the coil 92 is close-circuited to permit the relay 93 to return to its de-energized condition.

When the contact members 95 are disengaged, because of the de-energization of the relay 93, the resistor 96 is disconnected from the circuit between the exciter generator 6 and the storage battery 11 and only the resistor 81 is left in the circuit. The station then continues to operate with the exciter generator 6 supplying substantially the proper amount of energy through the resistor 81 to actuate the controlling means when the exciter generator is in the proper energy-delivering condition for so doing. When the exciter generator 6 is not in such condition, however, the storage battery 11 supplies the necessary energy as previously described.

The ampere-hour meter 12 is provided with a compensating winding 97 that is so disposed with respect to the magnetic circuit of the meter as to cause the meter to operate more rapidly when the storage battery is supplying energy than when it is being supplied with energy at the same time. This coil, therefore, compensates for the inefficiency of the storage battery 11 so that for every ampere-hour that the battery discharges it is charged slightly in excess of one ampere-hour. The ratio of this charging rate to the discharging rate may be so adjusted after determining the efficiency of the battery as to maintain the battery in its proper energy-restoring condition at all times.

Referring to Fig. 2 of the drawings, the same apparatus and circuits are here shown schematically as in Fig. 1 and the same reference numerals have been applied to the same pieces of apparatus.

It will be understood that the system embodying my invention is not limited to the specific details of construction and connections that have been described in the foregoing specification, as many changes and modifications may be made therein without departing from the spirit and scope of my invention, as set forth in the appended claims.

I claim as my invention:

1. The combination with an electrical translating device having a field-magnet winding, a generator for supplying energy to the field-magnet winding and automatic means for initiating and controlling the operation of the translating device, of energy-storing means for supplying energy to actuate the automatic means only when the generator is not in an energy-delivering condition.

2. The combination with an electrical translating device having a field-magnet winding, a generator for supplying energy to the field-magnet winding, automatic means for initiating and controlling the operation of the translating device and energy-storing means for supplying energy to actuate the automatic means when the generator is not in an energy-delivering condition, of means for automatically causing the generator to supply energy to actuate the automatic means when it is in an energy-delivering condition.

3. The combination with an electrical translating device having a field-magnet winding, a generator for supplying energy to the field-magnet winding, automatic means for initiating and controlling the operation of the translating device and energy-storing means for supplying energy to actuate the automatic means only when the generator is not in an energy-delivering condition, of means for automatically causing the generator to supply energy to the energy-storing means when the generator is in an energy-delivering condition and the amount of energy available in the storing means is below a predetermined value.

4. The combination with an electrical translating device having a field-magnet winding, a generator for supplying energy to the field-magnet winding, automatic means for initiating and controlling the operation of the translating device and energy-storing means for supplying energy to actuate the automatic means only when the generator is not in an energy-delivering condition, of means for automatically stopping the supply of energy from the generator to the energy-storing means when the amount of energy available therein exceeds a predetermined value.

5. The combination with an electrical translating device having a field-magnet winding, an exciter generator for supplying energy to the field-magnet winding, a system of relays and circuit interrupters for automatically initiating and controlling the operation of the translating device, a storage battery for supplying energy to the system of relays and circuit interrupters under predetermined conditions, and a variable resistor, of means for effecting the connection of a predetermined part of the resistor in circuit between the storage battery and the exciter generator when the exciter generator voltage exceeds a predetermined value.

6. The combination with an electrical translating device having a field-magnet winding, an exciter generator for supplying energy to the field-magnet winding, a system of relays and circuit interrupters for automatically initiating and controlling the operation of the translating device, a storage battery for supplying energy to the system of relays and circuit interrupters under predetermined conditions, and a variable resistor, of means for precluding the connection of any part of the resistor in circuit between the storage battery and the exciter generator when the generator is not in an energy-delivering condition.

7. The combination with an electrical translating device having a field-magnet winding, an exciter generator for supplying energy to the field-magnet winding, a system of relays and circuit interrupters for automatically initiating and controlling the operation of the translating device, a storage battery for supplying energy to the system of relays and circuit interrupters under predetermined conditions, an ampere-hour meter connected in circuit between the storage battery and the system of relays and circuit interrupters, and a variable resistor, of means controlled by the ampere-hour meter for controlling the connection of a predetermined part of the resistor in circuit between the storage battery and the exciter generator when the generator is in an energy-delivering condition.

8. The combination with an electrical translating device having a field-magnet winding, an exciter generator for supplying energy to the field-magnet winding, a system of relays and circuit interrupters for automatically initiating and controlling the operation of the translating device, a storage battery for supplying energy to the system of relays and circuit interrupters under predetermined conditions, an ampere-hour meter connected in circuit between the storage battery and the system of relays and circuit interrupters, and a variable resistor, of means controlled by the ampere-hour meter for effecting the connection of a predetermined part of the resistor in circuit between the storage battery and the exciter generator when the generator is in an energy-delivering condition.

9. The combination with an electrical translating device having a field-magnet winding, an exciter generator for supplying energy to the field-magnet winding, a system of relays and circuit interrupters for automatically initiating and controlling the operation of the translating device, a storage battery for supplying energy to the system of relays and circuit interrupters under predetermined conditions, an ampere-hour meter connected in circuit between the storage battery and the system of relays and circuit interrupters, and a variable resistor, of means controlled by the ampere-hour meter for effecting the disconnection of a predetermined part of the resistor from the circuit extending between the storage battery and the exciter generator when the generator is in an energy-delivering condition.

In testimony whereof, I have hereunto subscribed my name this 8th day of January 1924.

ROY J. WENSLEY.